US012616175B2

(12) United States Patent (10) Patent No.: US 12,616,175 B2
Brunner et al. (45) Date of Patent: May 5, 2026

(54) AQUARIUM SYSTEM HAVING IMPROVED FLOW CONTROLLER AND METHODS OF USE

(71) Applicant: Spectrum Brands, Inc., Middleton, WI (US)

(72) Inventors: William Nathan Brunner, Middleton, WI (US); William D. Himes, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 18/799,348

(22) Filed: Aug. 9, 2024

(65) Prior Publication Data

US 2025/0057127 A1 Feb. 20, 2025

Related U.S. Application Data

(60) Provisional application No. 63/604,521, filed on Nov. 30, 2023, provisional application No. 63/532,504, filed on Aug. 14, 2023.

(51) Int. Cl.
| | |
|---|---|
| *A01K 63/04* | (2006.01) |
| *B01F 23/23* | (2022.01) |

(Continued)

(52) U.S. Cl.
CPC ...... *A01K 63/042* (2013.01); *B01F 23/23105* (2022.01); *B01F 35/2211* (2022.01);

(Continued)

(58) Field of Classification Search
CPC .... A01K 63/042; A01K 63/04; A01K 63/006; A01K 63/045; A01K 63/047;

(Continued)

(56) References Cited

U.S. PATENT DOCUMENTS

| 4,842,727 A | 6/1989 | Willinger et al. | |
|---|---|---|---|
| 9,010,734 B1 * | 4/2015 | Vlasak .................... | B01F 25/53 |
| | | | 261/36.1 |

(Continued)

FOREIGN PATENT DOCUMENTS

| CA | 3024789 A1 | 5/2019 |
|---|---|---|

*Primary Examiner* — Dapinder Singh
(74) *Attorney, Agent, or Firm* — Greenberg Traurig, LLP; Danielle Abramson; Heath Briggs

(57) ABSTRACT

A flow control arrangement for use with a pump in an aquarium includes a main body having an inlet flow conduit and an outlet flow conduit. The main body has a cylindrical wall having first and second opposite open ends and defining an open interior; and a through hole extending through the wall to the open interior. A flow control dial closes the first open end; and an aeration flow dial closes the second open end and is rotatably adjustable relative to the main body. The aeration flow dial has a tubular aeration wall extending into the open interior. The aeration wall has an aperture, wherein the aeration flow dial can be rotatably adjustable to control axial alignment of the aperture with the through hole in the wall of the main body to selectively adjust a size of a resulting orifice from the open interior of the main body to outside of the main body.

11 Claims, 10 Drawing Sheets

(51) Int. Cl.

| | |
|---|---|
| *B01F 23/231* | (2022.01) |
| *B01F 35/22* | (2022.01) |
| *B01F 35/221* | (2022.01) |
| *B01F 35/71* | (2022.01) |
| *B01F 101/00* | (2022.01) |

(52) U.S. Cl.
    CPC .. *B01F 35/7176* (2022.01); *B01F 35/718051* (2022.01); *B01F 2101/305* (2022.01); *B01F 2215/0422* (2013.01)

(58) Field of Classification Search
    CPC ........... B01F 23/23105; B01F 23/2323; B01F 25/53; B01F 35/2211; B01F 35/7175; B01F 35/718051; B01F 2101/305; B01F 2215/0422
    See application file for complete search history.

(56) References Cited

U.S. PATENT DOCUMENTS

| | | | |
|---|---|---|---|
| 9,701,554 B2 * | 7/2017 | Prescott | .................... C02F 1/68 |
| 10,638,732 B2 | 5/2020 | Brunner et al. | |
| 11,039,605 B2 | 6/2021 | Brunner et al. | |
| 11,130,100 B1 * | 9/2021 | Berg | ................. B01F 25/31243 |
| 11,412,717 B1 * | 8/2022 | Mihlbauer | ........... A01K 63/006 |
| 11,641,848 B1 | 5/2023 | Mihlbauer et al. | |
| 11,690,360 B2 | 7/2023 | Brunner et al. | |
| 2021/0180702 A1 | 6/2021 | Lee | |
| 2023/0337641 A1 | 10/2023 | Brunner et al. | |

* cited by examiner

*FIG.* 3

*FIG.* 6
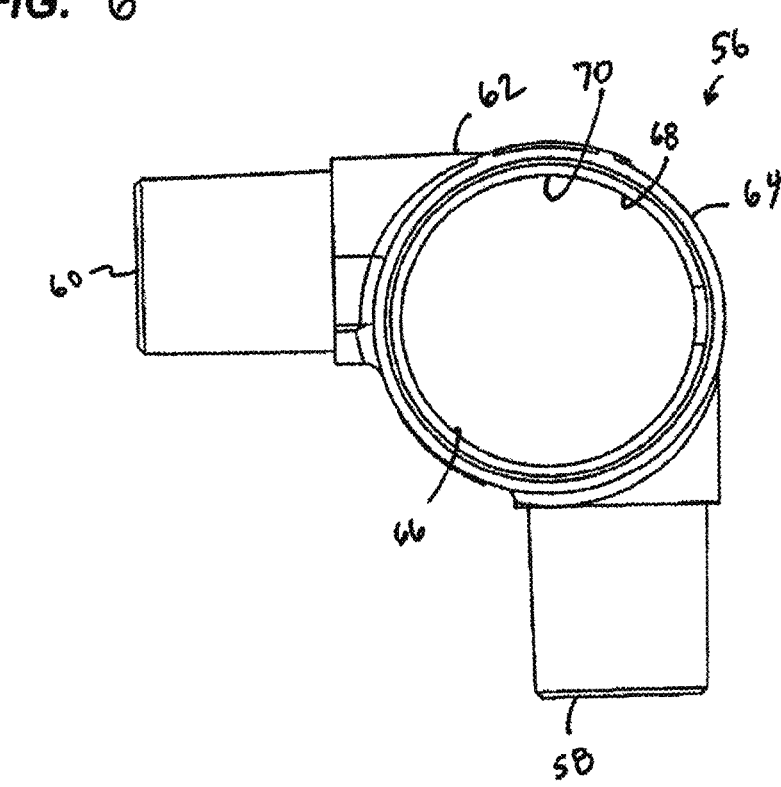
*FIG.* 7
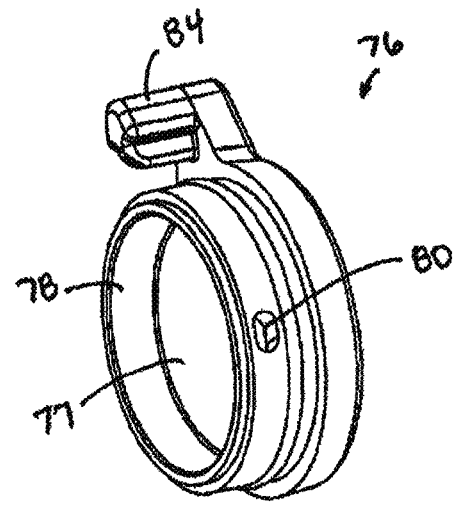

AQUARIUM SYSTEM HAVING IMPROVED FLOW CONTROLLER AND METHODS OF USE

CROSS-REFERENCE TO RELATED APPLICATIONS

This application claims priority to U.S. provisional patent application 63/604,521 filed on Nov. 30, 2023; and to U.S. provisional patent application 63/532,504 filed on Aug. 14, 2023, the disclosures of which are herein incorporated by reference in their entirety.

TECHNICAL FIELD

This disclosure relates to an aquarium system with a flow controller. In particular, this disclosure relates to a flow controller that can be adjusted to increase or decrease the amount of aeration of the water, and method of use.

BACKGROUND

Home aquariums are a popular hobby. People enjoy keeping fish and other aquatic animals in an aquarium for relaxation, enjoyment, and education.

To keep aquatic life healthy, aquariums should have aerators to help oxygenate the water. Improvements are desirable.

SUMMARY

Assemblies, components, and methods are provided to improve the prior art.

In one aspect, a flow control arrangement for use with a pump in an aquarium is provided; the flow control arrangement comprising: a main body having an inlet flow conduit and an outlet flow conduit; the main body having a cylindrical wall having first and second opposite open ends and defining an open interior; and a through hole extending through the wall to the open interior; a flow control dial closing the first open end; and an aeration flow dial closing the second open end and being rotatably adjustable relative to the main body; the aeration flow dial having a tubular aeration wall extending into the open interior; the aeration wall having an aperture, wherein the aeration flow dial can be rotatably adjustable to control axial alignment of the aperture with the through hole in the wall of the main body to selectively adjust a size of a resulting orifice from the open interior of the main body to outside of the main body.

In example embodiments, the aeration flow dial includes an aeration flow handle projecting therefrom to allow for grasping for rotatable adjustment.

In some implementations, the flow control dial has first and second projections extending into the open interior and is rotatably adjustable relative to the main body, wherein the flow control dial is rotatably adjustable to control the first and second projections to block portions of the inlet flow conduit and the outlet flow conduit.

In many examples, the flow control dial has a flow control handle projecting therefrom to allow for grasping for rotatable adjustment.

Preferably, the inlet flow conduit and an outlet flow conduit are oriented between 80-120 degrees relative to each other.

In some examples, the through hole and the aperture are oval shaped.

In another aspect, an aquarium system is provided including: a tank having an interior volume holding water; a pump positioned to pump water in the tank through a filter system; and a flow control arrangement connected to the pump; the flow control arrangement having an aeration control to allow selective adjustment in an amount of aeration of water flowing from the pump and back into the tank.

In many implementations, the flow control arrangement includes a rotatable dial to selectively increase or decrease aeration of the water.

Example embodiments include the flow control arrangement having a main body downstream of the pump; the main body having a through hole providing communication into an interior of the main body; and an aeration flow dial having an aperture, wherein the aeration flow dial can be rotatably adjustable to control axial alignment of the aperture with the through hole in the main body to selectively adjust a size of a resulting orifice from the interior of the main body to outside of the main body.

In examples, a diffuser body and blade are connected to the main body and positioned to return water to the tank.

In another aspect, a method of aerating water in an aquarium tank is provided. The method comprises: providing a flow control arrangement having a main body with a through hole providing communication into an interior of the main body; and an aeration flow dial connected to the main body; the aeration flow dial having an aperture; rotating the aeration flow dial to adjust axial alignment of the aperture with the through hole in the main body to selectively adjust a size of a resulting orifice from the interior of the main body to outside of the main body; and pumping water through the flow control arrangement.

Example methods have the step of rotating including using a handle on the aeration flow dial to adjust the size of the resulting orifice.

In another aspect, a pump arrangement for use with an aquarium is provided; the pump arrangement comprising: a water intake tube assembly positionable in an aquarium tank; a pump having a suction inlet and a pressure outlet; the intake tube assembly being in fluid communication upstream of the suction inlet, such that water from the aquarium tank is sucked into the intake tube assembly and conveyed into the pump suction inlet and then expelled through the pressure outlet; and a flow control valve positioned within the intake tube assembly upstream of the suction inlet; the flow control valve being manually adjustable to control a volume of water directed into the suction inlet.

In one aspect, the valve includes a rotatable dial to selectively increase or decrease the volume of water directed into the suction inlet.

In one aspect, the valve includes: a cover; the dial having a handle protruding from the cover; and a body extending from the cover on an opposite side of the dial and into the intake tube assembly; the body having a flange extending circumferentially from only a portion of a rim of the cover; wherein rotation of the dial rotates the flange within the intake tube assembly to control a size of an orifice in the intake tube assembly.

In examples, the flange extends between 90-220° along the rim of the cover of the valve.

In an embodiment, the flange extends between 160-200° along the rim of the cover of the valve.

In another aspect, a method of controlling water in an aquarium tank is provided. The method comprising providing a water intake tube assembly positioned in an aquarium tank and a flow control valve positioned within the intake tube assembly upstream of a pump; rotating a dial of the flow control valve to selectively adjust a size of an orifice in the intake tube assembly; and using the pump to pump water from the aquarium tank, through the orifice in the intake tube assembly, and into a suction inlet of the pump.

In an example method, the step of rotating includes using a handle on the dial to adjust the size of the orifice.

In an example method, the step of rotating includes the valve having: a cover; the handle protruding from the cover; and a body extending from the cover on an opposite side of the dial and into the intake tube assembly; the body having a flange extending circumferentially from only a portion of a rim of the cover; wherein rotation of the dial rotates the flange within the intake tube assembly to control a size of the orifice in the intake tube assembly.

A variety of examples of desirable product features or methods are set forth in part in the description that follows, and in part will be apparent from the description, or may be learned by practicing various aspects of this disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 6 is a side view of a main body of the flow controller of FIG. 4;

FIG. 7 is a perspective view of an aeration flow dial of the flow controller of FIG. 4;

DETAILED DESCRIPTION

The Embodiment of FIGS. 1-7

Figure 1:
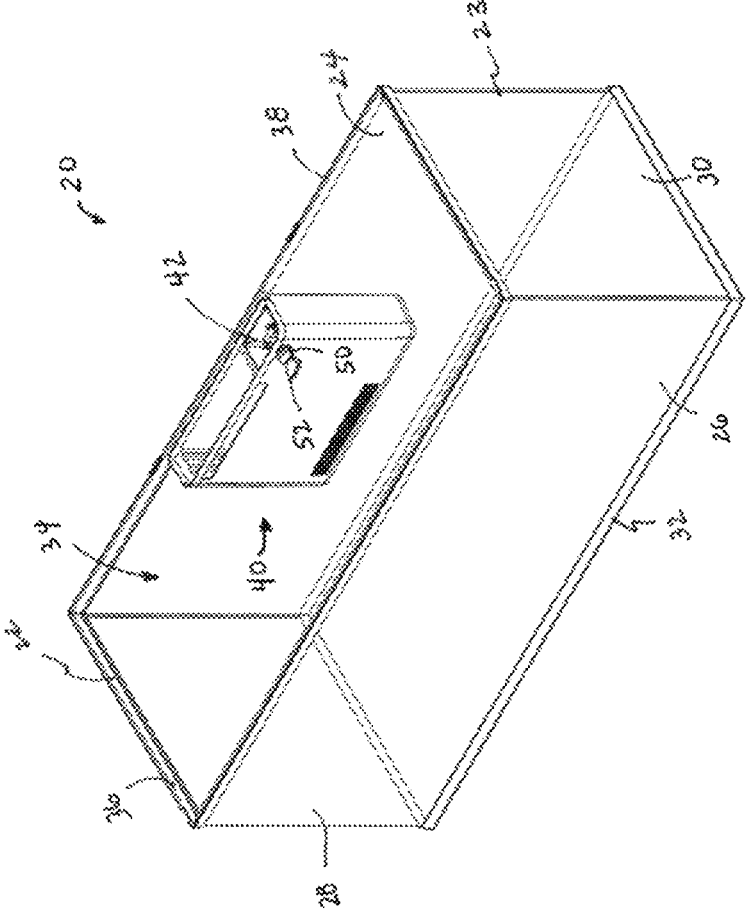
FIG. 1 is schematic view of an aquarium system, including a tank and a back panel assembly having a flow controller, constructed in accordance with principles of this disclosure.

FIG. 1 is a schematic view of one embodiment of an aquarium system 20. In FIG. 1, the system 20 has a tank 22 sized to hold water for sustaining aquatic life, such as fish.

The tank 22 shown has a rectangular cross-section, but it can be other shapes. While the tank may be of any size, some example sizes include 10 gallons, 20 gallons, 40 gallons, 50 gallons, 100 gallons to 200 gallons of water. In this example, the tank 22 has a surrounding wall 23 shown here as back wall 24, an opposite front wall 26, and two side walls 28, 30 extending between the front wall 26 and back wall 24. A closed bottom is at 32. Together, the surrounding wall 23 and closed bottom 32 define a tank interior 34.

The tank 22 has an open top 36, opposite of the closed bottom 32. The top 36 is in communication with the tank interior 34 and has a perimeter rim 38. The top 36 can be selectively covered with a removable cover, not illustrated.

The aquarium system 20 further includes a back panel assembly 40 positioned in the interior 34 of the tank 22. In the example of FIG. 1, the back panel assembly 40 is positioned against the back wall 24 of the tank 22. In the back panel assembly 40 can be a filter system. Also in the back panel assembly is a pump and flow controller system 42, FIG. 2.

Figure 2:
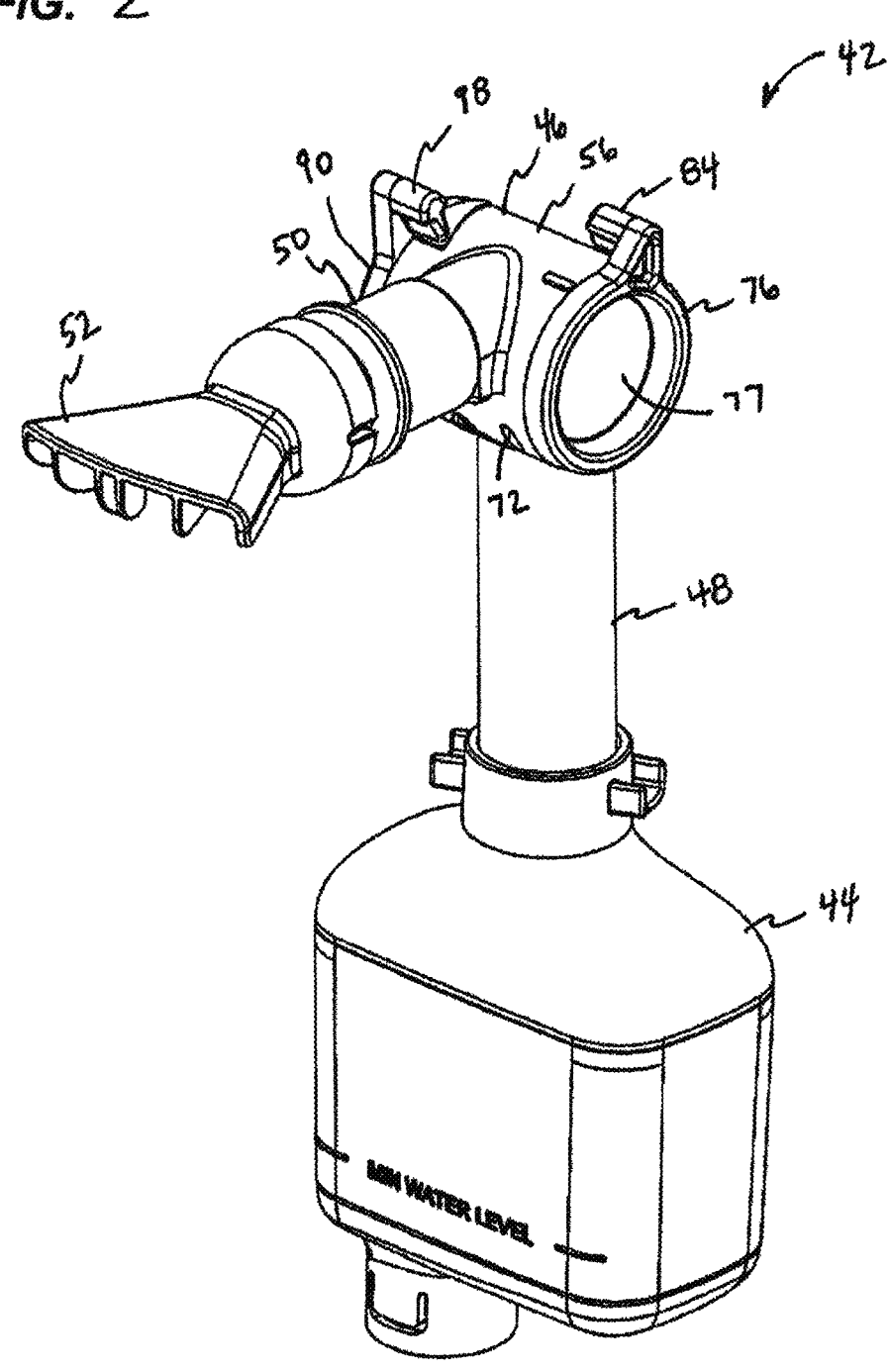
FIG. 2 is a perspective view of a pump and flow controller, used in the aquarium system of FIG. 1.

Attention is directed to FIG. 2, showing the pump and flow controller system 42. The system 42 includes a pump 44. A flow control arrangement, or flow controller, is shown at 46. A fluid tube 48 connects the pump 44 and flow controller 46.

The pump 44 draws in water from the tank 22. The water may be conveyed through a filter system (not shown). The water will be conveyed through the tube 48 to the flow controller 46. The flow controller 46 is constructed and arranged to aerate the water, and the amount of aeration can be adjusted, as described below.

In addition, the flow controller 46 can function to control the amount of water flowing therethrough (i.e., the flow rate).

Connected to the flow controller 46 is a diffuser body 50 and a blade 52. The water is conveyed from the flow controller 46, through the diffuser body 50 and then through the blade 52. From the blade 52, the water is returned into the main body of water in the tank 22. The flow controller 46 will be located above the water level in the tank 22.

Figure 3:
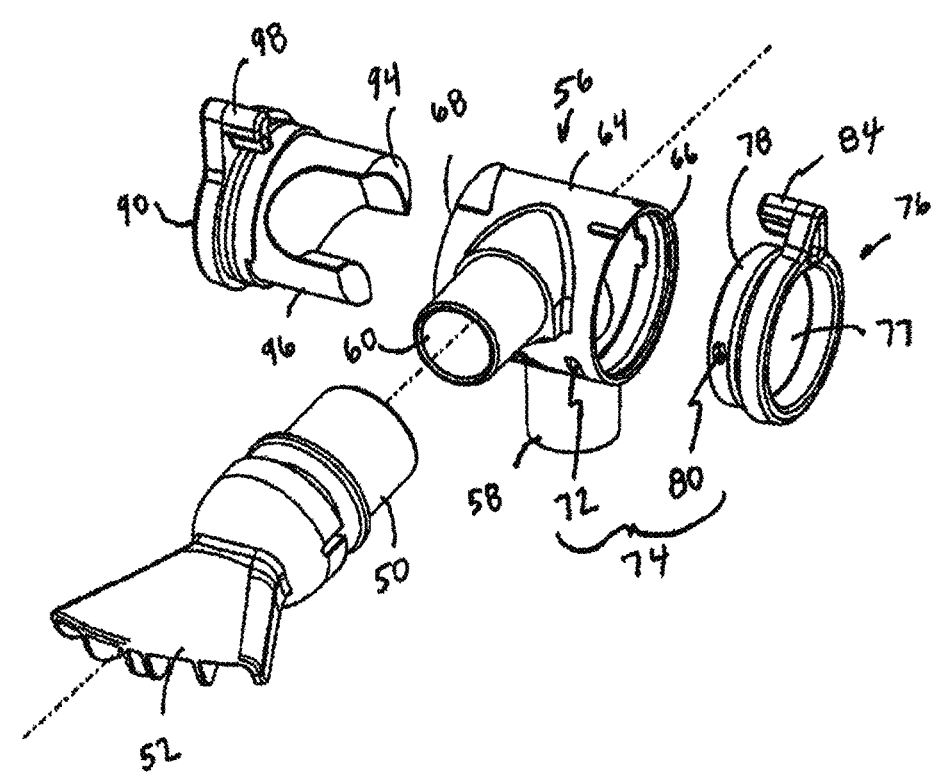
FIG. 3 is an exploded perspective view of the flow controller and additional components, of FIG. 2.
Figure 4:
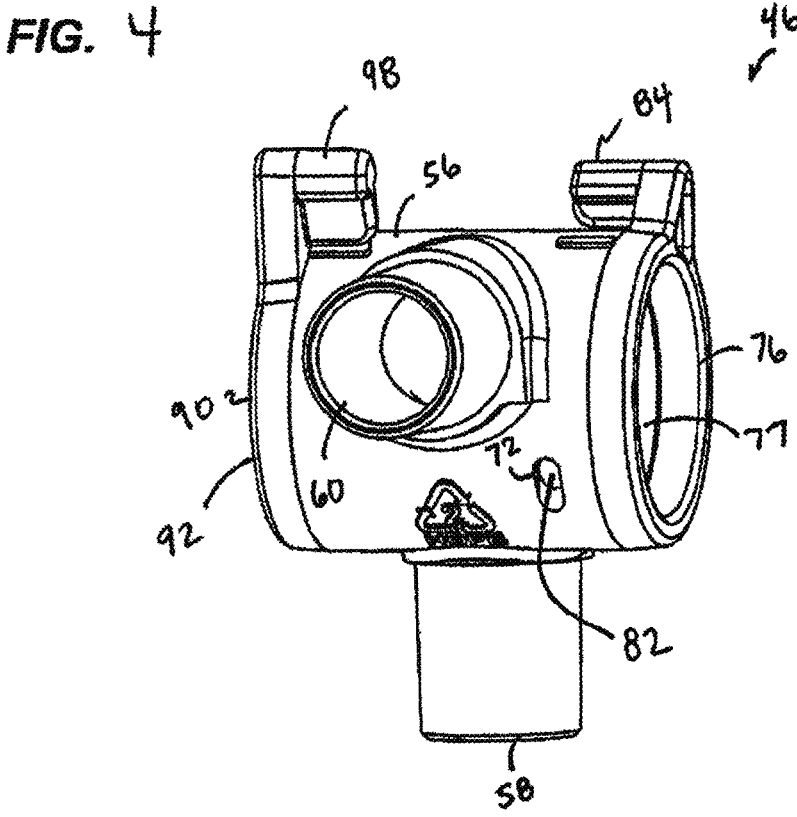
FIG. 4 is a perspective view of the flow controller of FIG. 2.

Attention is directed to FIGS. 3 and 4. The flow controller 46 has a main body 56 having an inlet flow conduit 58 and an outlet flow conduit 60. Inlet water flows from the pump 44, through the tube 48, and into the inlet flow conduit 58. The water then flows from the main body 56 through the outlet flow conduit 60. In general, the inlet flow conduit 58 and outlet flow conduit are angled between 80-120 degrees, and typically at about a 90 degree angle, forming an elbow 62 (FIG. 6).

The main body 56 has a cylindrical wall 64 having a first open end 66 and an opposite second open end 68. The wall 64 defines an open interior 70 for receiving the flow of water.

Figure 5:
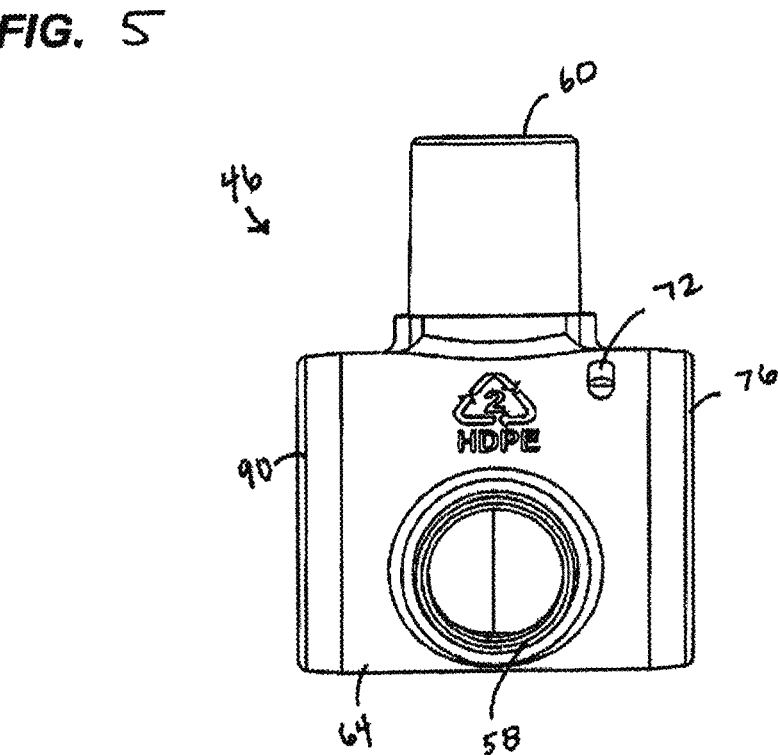
FIG. 5 is a bottom plan view of the flow controller of FIG. 4.

In FIGS. 3 and 5, a through hole 72 can be seen extending through the wall 64 to the open interior 70. The hole 72 can be many shapes, and in the example shown, the hole 72 is oval or elliptical in shape. The hole 72 is one part of an aeration adjustment system 74 (FIG. 3).

An aeration flow dial 76 closes the first open end 66 and is rotatably adjustable relative to the main body 56. In FIG. 7, the aeration flow dial 76 is shown in perspective view. As can be seen, the aeration flow dial 76 has an end cover 77 and a cylindrical or tubular aeration wall 78 extending from the end cover 77. When fitted into the second open end 68, the aeration wall 78 is received within the interior 70 of the main body 56, against an inside surface of the wall 64 of the main body 56 such that the aeration wall 78 extends into the open interior 70.

The aeration wall 78 has an aperture 80. The aperture 80 is a second part of the aeration adjustment system 74 (FIG. 3). The aperture 80 can be many shapes, and in the example shown, the aperture 80 is oval or elliptical in shape.

The aeration flow dial 76 can be rotatably adjustable relative to the main body 56 to control axial alignment of the aperture 80 with the through hole 72 in the wall 64 of the main body 56 to selectively adjust a size of a resulting orifice 82 from the open interior 70 of the main body 56 to outside of the main body 56.

The aeration flow dial 76 further includes a handle 84 projecting from the end cover 77. The handle 84 is sized to be grippable by a few fingers of a human hand to allow for rotation of the dial 76 relative to the body 56.

A flow control dial 90 closes the second open end 68. The flow control dial 90 includes an end cover 92. First and second projections 94, 96 extend from the end cover 92 into the open interior 70. The flow control dial 90 is rotatably adjustable relative to the main body 56. This rotation moves the first and second projections 94, 96 to block portions of the inlet flow conduit 58 and the outlet flow conduit 60.

The flow control dial 90 has a flow control handle 98 projecting from the end cover 92 to allow for grasping by a human hand for easy rotatable adjustment.

It should be appreciated that rotation of the aeration flow dial 76 will allow the user to adjust how big or small the resulting orifice 82 is, when the aperture 80 is moved in axial alignment with the through hole 72. When perfectly aligned (that is, the centers of the hole 72 and aperture 80 are co-axially aligned), the orifice 82 will be at its largest, providing the most amount of water that can flow from the interior 70 of the body 56 to outside of the controller 46, with the most aeration. Since the controller 46 is positioned above the water line in the tank 22, the water flowing through the orifice 82 is expelled into the air, which helps to oxygenate it, before it falls back into the rest of the water in the tank 22. When there is no axial alignment of the aperture 80 and the hole 72, the orifice 82 will be blocked. When there is only partial axial alignment, the orifice 82 will be open, but will be smaller than when the hole 72 and aperture 82 are in perfect coaxial alignment.

The above can be used for a method of aerating water in an aquarium tank. The method includes providing the flow control arrangement 46 having main body 56 with through hole 72 providing communication into the interior 70 of the main body 56. The aeration flow dial 76 is connected to the main body 56, and the aeration flow dial 76 has aperture 80.

The method includes rotating the aeration flow dial 76 to adjust axial alignment of the aperture 80 with the through hole 72 in the main body 56 to selectively adjust a size of the resulting orifice 82 from the interior 70 of the main body 56 to outside of the main body.

The method includes pumping water through the flow control arrangement 46.

The step of rotating includes using handle 84 on the aeration flow dial 76 to adjust the size of the resulting orifice 82.

The Embodiment of FIGS. 8-14

Figure 8:
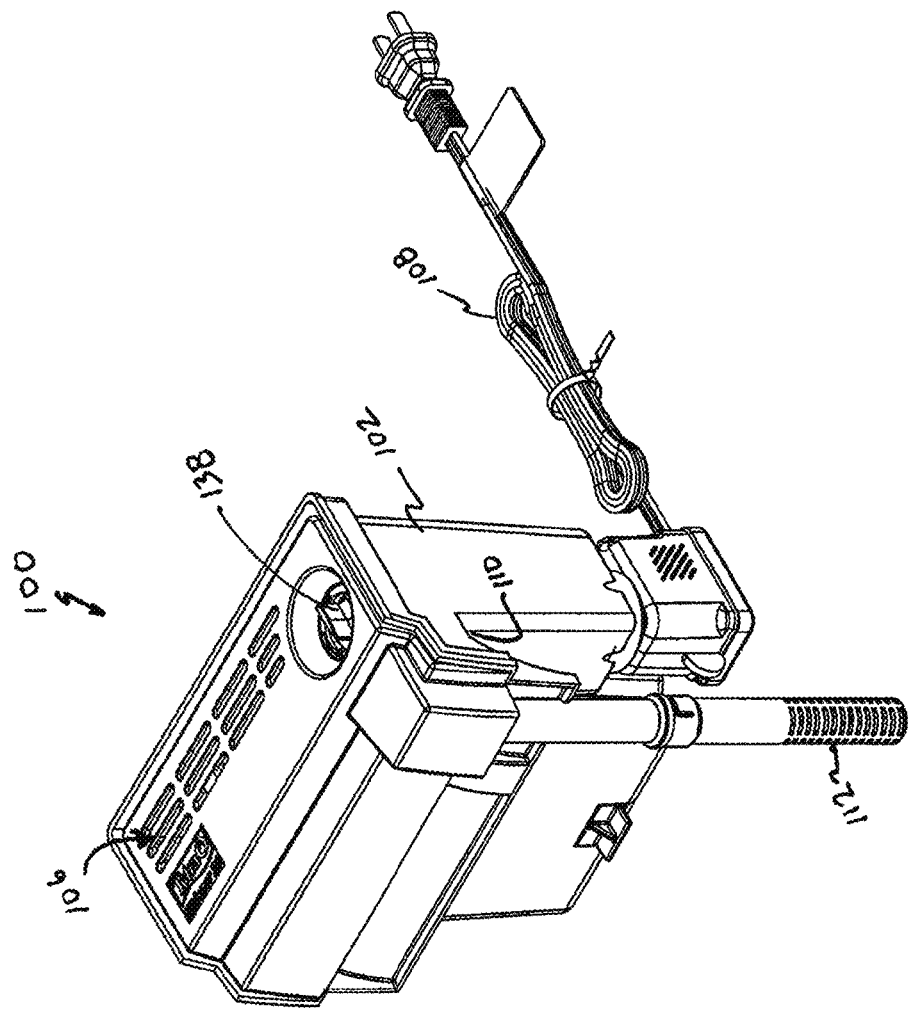
FIG. 8 is a perspective view of a pump arrangement with filter assembly having a flow control valve, constructed in accordance with principles of this disclosure.
Figure 9:
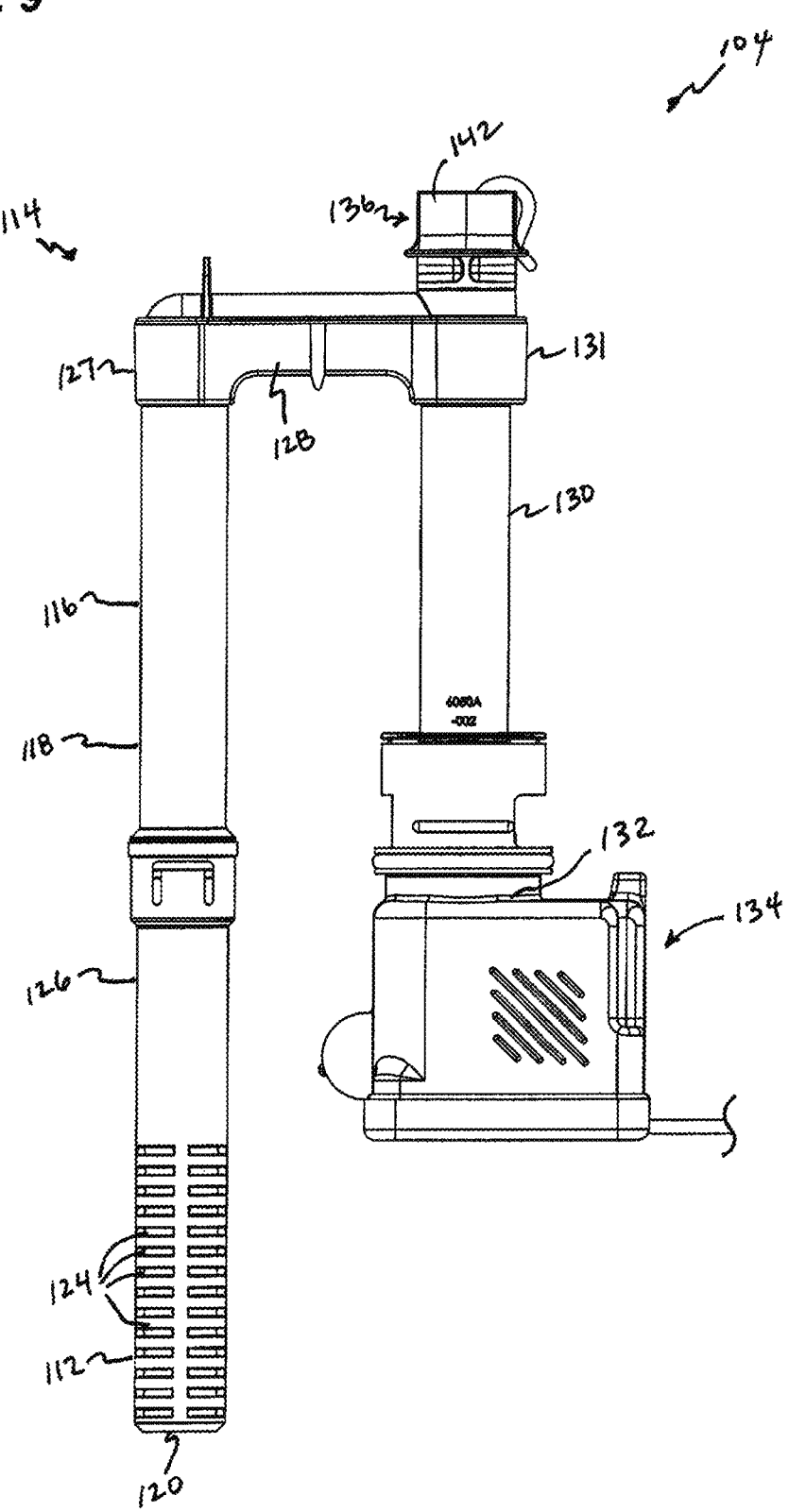
FIG. 9 is a side view of the pump arrangement with flow control valve depicted in FIG. 8.

FIG. 8 illustrates a pump arrangement and filter system 100. The system 100 is constructed to be positioned along the side wall of an aquarium tank. The system 100 includes a housing 102 holding a pump arrangement 104 (FIG. 9). The housing 102 also holds a filter assembly 106 in the interior. The housing 102 defines a slot 110, which accommodates the wall of the aquarium tank, so that a part 112 of a water intake tube assembly 114 (FIG. 10) is submerged in the water of the tank, which the remaining part of the system 100 is outside of the water of the tank.

As can be seen in FIG. 8, there is an electrical cord 108, which plugs into an electrical outlet, to power the pump arrangement 104. In general, the pump arrangement 104 draws in water from the aquarium tank through the part 112 of the intake tube assembly 114, which is then pushed through the filter assembly 106 where it is filtered, and then returned to the tank.

Figure 10:
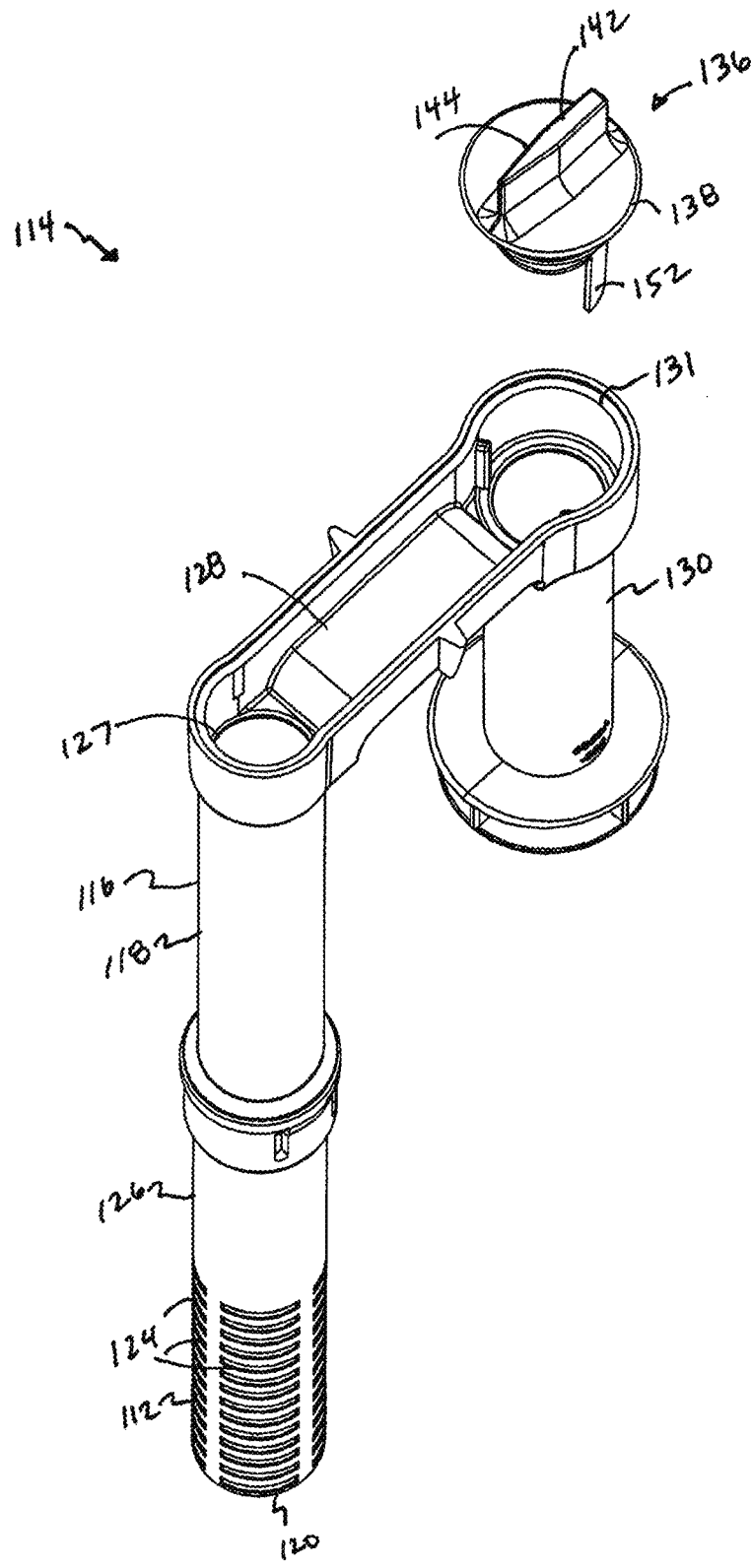
FIG. 10 is an exploded perspective view of an intake tube assembly and flow control valve used in the pump arrangement of FIG. 9.

Turning now to FIG. 9, the pump arrangement 104 is illustrated. In FIG. 10, the water intake tube assembly 114 is shown. The intake tube assembly 114 includes a generally hollow conduit 116 with a first, straight section 118. The first section 118 has a free, terminal end 120. The conduit 120, from the free end 120, defines intake part 112, in which a wall 122 of the conduit 116 has open holes or slots 124 through which water from the aquarium tank is drawn through and into the interior of the conduit 116. In the example embodiment shown, the intake part 112 of the first section 118 extends less than 50% of the length of the first section 118, but could be more or less in other embodiments. A remaining part 126 of the first section 118 is solid and is free of holes or slots.

The conduit 116 of the intake tube assembly 114 includes a second section 128 oriented at a non-zero angle from an end 127 of the first section 118. In the example shown, the angle is between 50-130 degrees, typically about 90 degrees, but could be other angles. The second section 128 forms a bridge between the first section 118 and a third section 130.

The conduit 116 includes third section 130 oriented at a non-zero angle from an end 131 of the second section 128. In the example shown, the angle is between 50-130 degrees, typically about 90 degrees, but could be other angles. The third section 130 extends from the second section 128 to a suction inlet 132 of a pump 134. While many embodiments are possible, in the particular example shown in the drawings, the third section 130 is generally parallel to the first section 118, such that the first section 118, second section 128, and third section 130 are in the shape of a U, in this case with squared corners, but could be rounded as well.

The pump arrangement 104 includes a flow control valve 136 positioned within the intake tube assembly 114 upstream of the suction inlet 132. The flow control valve 136 is manually adjustable to control a volume of water directed into the suction inlet 132. In the embodiment shown, the flow control valve 136 is positioned in the third section 130. For example, the flow control valve 136 is oriented at an end of the second section 128 and at an end and within the third section 130. Manual adjustment of the valve 136 controls the volume of water flowing from the second section 128 into the third section 130.

In accordance with principles of this disclosure, the valve 136 includes a rotatable dial 138 to selectively increase or decrease the volume of water directed into the suction inlet 132. The dial 138 is accessible from outside of the system 100. As can be seen in FIG. 8, the dial 138 can be accessed through a top of the housing 102 by the user.

In reference now to FIGS. 11-14, the example embodiment of the valve 136 shown herein includes a cover 140. The dial 138 has a handle 142 protruding from the cover 140. The handle 142 is generally an elongated member 144 sized to be grasped between a thumb and few fingers of a human hand, such that the handle 142 can be used to rotate the dial 138.

Figure 11:
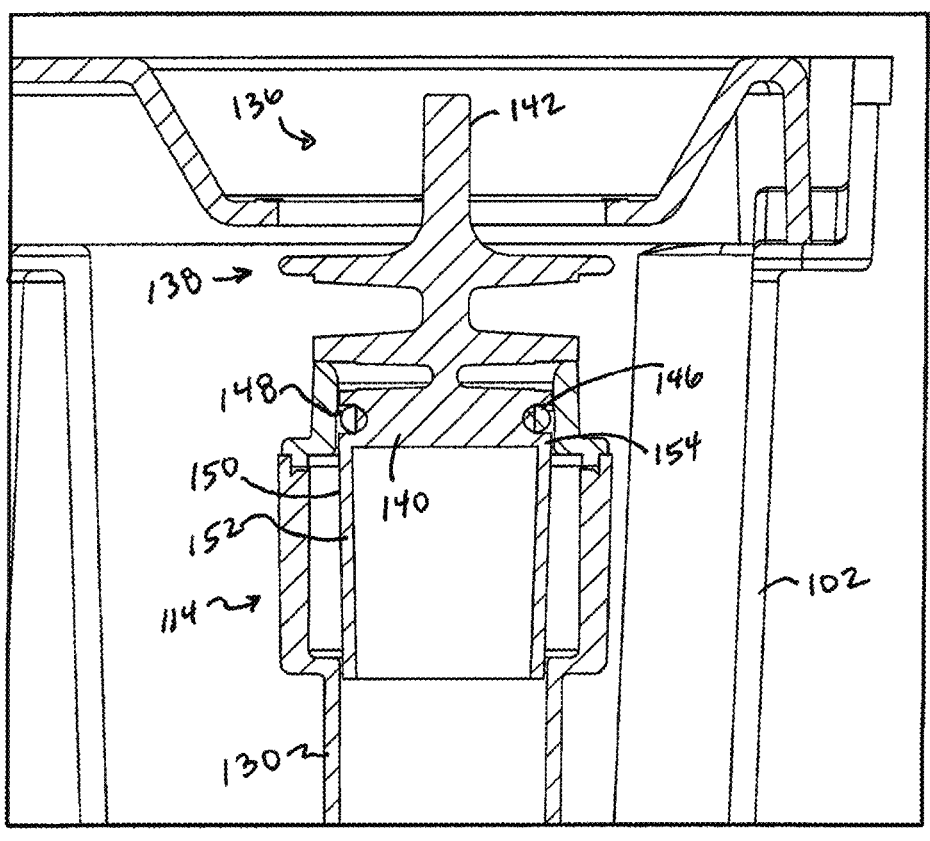
FIG. 11 is a cross-sectional view of the flow control valve located within the intake tube assembly of FIG. 10.
Figure 12:
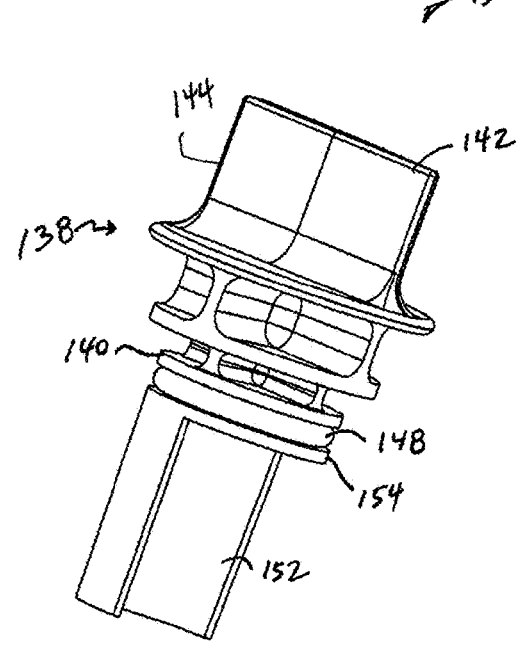
FIG. 12 is a perspective view of the flow control valve used in the arrangements of FIGS. 9-11.
Figure 13:
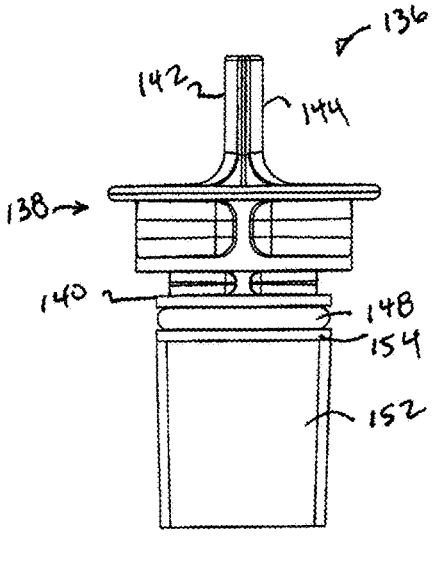
FIG. 13 is a front view of the flow control valve of FIG. 12.
Figure 14:
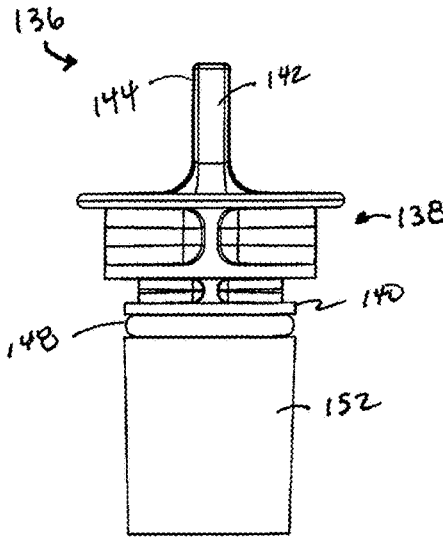
FIG. 14 is a back view of the flow control valve of FIGS. 12 and 13.

In FIG. 11, the cross-section of the valve 136 located in the third section 130 of the intake tube assembly 114 is illustrated. The cover 140 defines a groove 146 for holding a seal member 148. The seal member 148 forms a seal with an inside surface of the third section 130 of the intake tube assembly 114.

In this embodiment, the valve 136 includes a body 150 extending from the cover 140 on an opposite side of the dial 138 and into the intake tube assembly 114. The body 150 has a flange 152 extending circumferentially from only a portion of a rim 154 of the cover 140. Rotation of the dial 138 rotates the flange 152 within the intake tube assembly 114 to control a size of an orifice in the intake tube assembly 114.

The flange 152 extends circumferentially from only a portion of the rim 154 of the cover 140. For example, the flange 152 extends between 90-220° along the rim 152. Or, for example, the flange 152 extends between 160-200° along the rim 152 of the cover 140 of the valve 136.

The embodiment of FIGS. 8-14 can be used in a method of controlling water in an aquarium tank. The method includes providing water intake tube assembly 114 positioned in the tank of an aquarium and a flow control valve positioned within the intake tube assembly 114 upstream of the pump 134. The method includes rotating the dial 138 of the flow control valve 136 to selectively adjust a size of an orifice in the intake tube assembly 114. The method further includes using the pump 134 to pump (or draw in) water from the aquarium tank, through the orifice in the intake tube assembly 114, and into the suction inlet 132 of the pump 134.

The step of rotating includes using handle 142 on the dial 138 to adjust the size of the orifice.

The step of rotating includes the valve 136 having cover 140, with the handle 142 protruding from the cover 140. The valve 136 further includes body 150 extending from the cover 140 on an opposite side of the dial 138 and into the intake tube assembly 114. The body 150 has flange 152 extending circumferentially from only a portion of rim 154 of the cover 140. Rotation of the dial 138 rotates the flange 152 within the intake tube assembly 114 to control a size of the orifice in the intake tube assembly 114.

The above disclosure includes example principles. Many embodiments can be made using these principles.

What is claimed is:

1. A flow control arrangement for use with a pump in an aquarium; the flow control arrangement comprising:
  (a) a main body having an inlet flow conduit and an outlet flow conduit; the main body having a cylindrical wall having first and second opposite open ends and defining an open interior; and a through hole extending through the wall to the open interior;
  (b) a flow control dial closing the first open end; and
  (c) an aeration flow dial closing the second open end and being rotatably adjustable relative to the main body; the aeration flow dial having a tubular aeration wall extending into the open interior;
    (i) the aeration wall having an aperture, wherein the aeration flow dial can be rotatably adjustable to control axial alignment of the aperture with the through hole in the wall of the main body to selectively adjust a size of a resulting orifice from the open interior of the main body to outside of the main body.

2. The flow control arrangement of claim 1 wherein the aeration flow dial includes an aeration flow handle projecting therefrom to allow for grasping for rotatable adjustment.

3. The flow control arrangement claim 1 wherein the flow control dial has first and second projections extending into the open interior and is rotatably adjustable relative to the main body, wherein the flow control dial is rotatably adjustable to control the first and second projections to block portions of the inlet flow conduit and the outlet flow conduit.

4. The flow control arrangement of claim 1 wherein the flow control dial has a flow control handle projecting therefrom to allow for grasping for rotatable adjustment.

5. The flow control arrangement of claim 1 wherein the inlet flow conduit and an outlet flow conduit are oriented between 80-120 degrees relative to each other.

6. The flow control arrangement of claim 1 wherein the through hole and the aperture are oval shaped.

7. An aquarium system comprising:
  (a) a tank having an interior volume holding water;
  (b) a pump positioned to pump water in the tank through a filter system; and
  (c) a flow control arrangement connected to the pump; the flow control arrangement having an aeration control to allow selective adjustment in an amount of aeration of water flowing from the pump and back into the tank; wherein the control arrangement includes:
    (i) a main body downstream of the pump; the main body having a through hole providing communication into an interior of the main body; and
    (ii) an aeration flow dial having an aperture, wherein the aeration flow dial can be rotatably adjustable to control axial alignment of the aperture with the through hole in the main body to selectively adjust a size of a resulting orifice from the interior of the main body to outside of the main body.

8. The aquarium system of claim 7 wherein the flow control arrangement includes a rotatable dial to selectively increase or decrease aeration of the water.

9. The aquarium system of claim 7 further including a diffuser body and blade connected to the main body and positioned to return water to the tank.

10. A method of aerating water in an aquarium tank; the method comprising:
  (a) providing a flow control arrangement having a main body with a through hole providing communication into an interior of the main body; and an aeration flow dial connected to the main body; the aeration flow dial having an aperture;
  (b) rotating the aeration flow dial to adjust axial alignment of the aperture with the through hole in the main body to selectively adjust a size of a resulting orifice from the interior of the main body to outside of the main body; and
  (c) pumping water through the flow control arrangement.

11. The method of claim 10 wherein the step of rotating includes using a handle on the aeration flow dial to adjust the size of the resulting orifice.

* * * * *